United States Patent
Lee et al.

(10) Patent No.: US 8,586,878 B2
(45) Date of Patent: Nov. 19, 2013

(54) SWITCH ENGAGEMENT ASSEMBLY FOR AN AUTOMOBILE DOOR PANEL

(75) Inventors: Joel R. Lee, Peotone, IL (US); Walter Belchine, III, Plainfield, IL (US); Michael L. Farmer, Elwood, IL (US); James Meyer, Villa Hills, KY (US); Anthony Savoia, Roselle, IL (US); Todd Callister, Chicago, IL (US); David Bonadona, Steger, IL (US); Todd Henneike, Bourbonnais, IL (US); Sven Carlson, Manhattan, IL (US)

(73) Assignee: Illinois Tool Works Inc., Glenview, IL (US)

( * ) Notice: Subject to any disclaimer, the term of this patent is extended or adjusted under 35 U.S.C. 154(b) by 207 days.

(21) Appl. No.: 13/256,790

(22) PCT Filed: Mar. 3, 2010

(86) PCT No.: PCT/US2010/026013
§ 371 (c)(1),
(2), (4) Date: Sep. 15, 2011

(87) PCT Pub. No.: WO2010/107582
PCT Pub. Date: Sep. 23, 2010

(65) Prior Publication Data
US 2012/0012385 A1     Jan. 19, 2012

Related U.S. Application Data

(60) Provisional application No. 61/160,569, filed on Mar. 16, 2009.

(51) Int. Cl.
*H01R 13/506*     (2006.01)

(52) U.S. Cl.
USPC ............................. 174/561; 174/50; 292/347

(58) Field of Classification Search
USPC .......................... 174/50, 561; 292/347, 216
See application file for complete search history.

(56) References Cited

U.S. PATENT DOCUMENTS

| | | | | |
|---|---|---|---|---|
| 2,917,199 A * | 12/1959 | Appleton | ...................... | 220/3.7 |
| 3,525,450 A * | 8/1970 | Payson | ........................... | 220/3.7 |
| 4,899,063 A | 2/1990 | Suck | | |
| 4,916,265 A | 4/1990 | Luallen | | |
| 6,559,220 B2 * | 5/2003 | Hille | ............................. | 524/500 |
| 6,563,046 B1 * | 5/2003 | Jarry et al. | ....................... | 174/50 |
| 7,090,533 B1 * | 8/2006 | Houck et al. | ................... | 439/553 |
| 7,301,099 B1 * | 11/2007 | Korcz | ............................. | 174/58 |
| 7,410,072 B2 * | 8/2008 | Wegner et al. | ................. | 220/3.7 |
| 8,067,690 B2 * | 11/2011 | Anders et al. | ................... | 174/50 |

FOREIGN PATENT DOCUMENTS

FR        2819933 A1      7/2002

OTHER PUBLICATIONS

ISR for PCT/US2010/026013 dated Aug. 24, 2010.

* cited by examiner

*Primary Examiner* — Dhirubhai R Patel
(74) *Attorney, Agent, or Firm* — Mark W. Croll; Paul F. Donovan

(57) ABSTRACT

A switch engagement assembly includes a base component including a plurality of mating devices and a switch box configured to couple to the base component, the switch box including a plurality of complementary mating receptacles, each mating receptacle configured to receive a respective mating device. Also described herein is a vehicle arm rest including the switch engagement assembly.

15 Claims, 4 Drawing Sheets

SWITCH ENGAGEMENT ASSEMBLY FOR AN AUTOMOBILE DOOR PANEL

CROSS REFERENCE TO RELATED APPLICATION

This Non-Provisional Application is national phase of PCT/US2010/026013 filed Mar. 3, 2010, and claims benefit to U.S. Provisional Application Ser. No. 61/160,569 filed on Mar. 16, 2009.

BACKGROUND OF THE INVENTION

The present invention relates generally to switch assemblies, and more particularly to a switch engagement assembly located in an automobile door panel.

The interior side of automobile doors are typically covered with a trim piece to conceal the window, associated window hardware, and other automobile components. The trim piece typically includes an arm rest that is fixedly coupled to the trim piece. To control the operation of the windows, for example, at least some automobiles include a switch panel that is used to mount switches that open and close the windows. Conventional switch panels are fabricated as a single component. The single component includes a cover plate and a switch housing that is formed unitarily with the cover plate. The switch housing is typically recessed in the cover plate such that conventional switches are mounted substantially flush with the cover plate. The cover plate also improves the aesthetic appearance of the interior of the automobile. For example, a portion of the cover plate may be painted with a wood grain finish to match the wood grain finish of other interior portions of the automobile. Moreover, the switch housing may be painted black to match the color of the switch.

However, additional components are required to install the one-piece switch panel. The additional components may include, for example, additional screws, metal brackets, and/or adhesive materials. Additionally, if the customer desires that the cover plate be painted a different color than the switch housing, the cover plate and/or switch housing must be masked for painting. Masking a portion of the switch panel requires additional masking tools and may result in a higher scrap rate. Moreover, different vehicles may utilize different switches to operate the windows. As a result, manufacturers utilize different tooling to fabricate different switch panels to accommodate the different types of switches. Thus, the cost of fabricating a one-piece switch panel is increased, and the cost of replacing the switch panel may also be increased.

A need remains for a switch engagement assembly that may be utilized in a plurality of vehicles to accommodate different or similar switches. Moreover, a need remains for a switch engagement assembly that may be fabricated using less complex tooling, painting and/or masking procedures.

BRIEF DESCRIPTION OF THE INVENTION

In one embodiment, a two-piece switch engagement assembly. The switch engagement assembly includes a base component including a plurality of mating devices, and a switch box configured to couple to the base component, the switch box including a plurality of complementary mating receptacles, each mating receptacle configured to receive a respective mating device. The switch box is switch box is configured to snap to the base component. The base component includes a decorative trim surface that is disposed on a surface that is opposite to the mating devices. The base component also includes a plurality of adjustment devices configured to reposition the switch box with respect to the base. The adjustment devices include a first plurality of adjustment devices configured to reposition the switch box in a first direction with respect to the base component and a second plurality of adjustment devices configured to reposition the switch box in a second different direction with respect to the base component. The base component further includes a retaining wall disposed on an opposite second side of the base component from the decorative surface. The retaining wall is configured to receive the switch box therein. The switch box is configured to receive an electrical toggle switch device therein utilizing a plurality of lock ribs.

Also described herein is an exemplary vehicle arm rest that includes the two-piece switch engagement assembly.

Other features and advantages of the invention will become apparent to those skilled in the art upon review of the following detailed description, claims and drawings in which like numerals are used to designate like features.

Figure 1A:
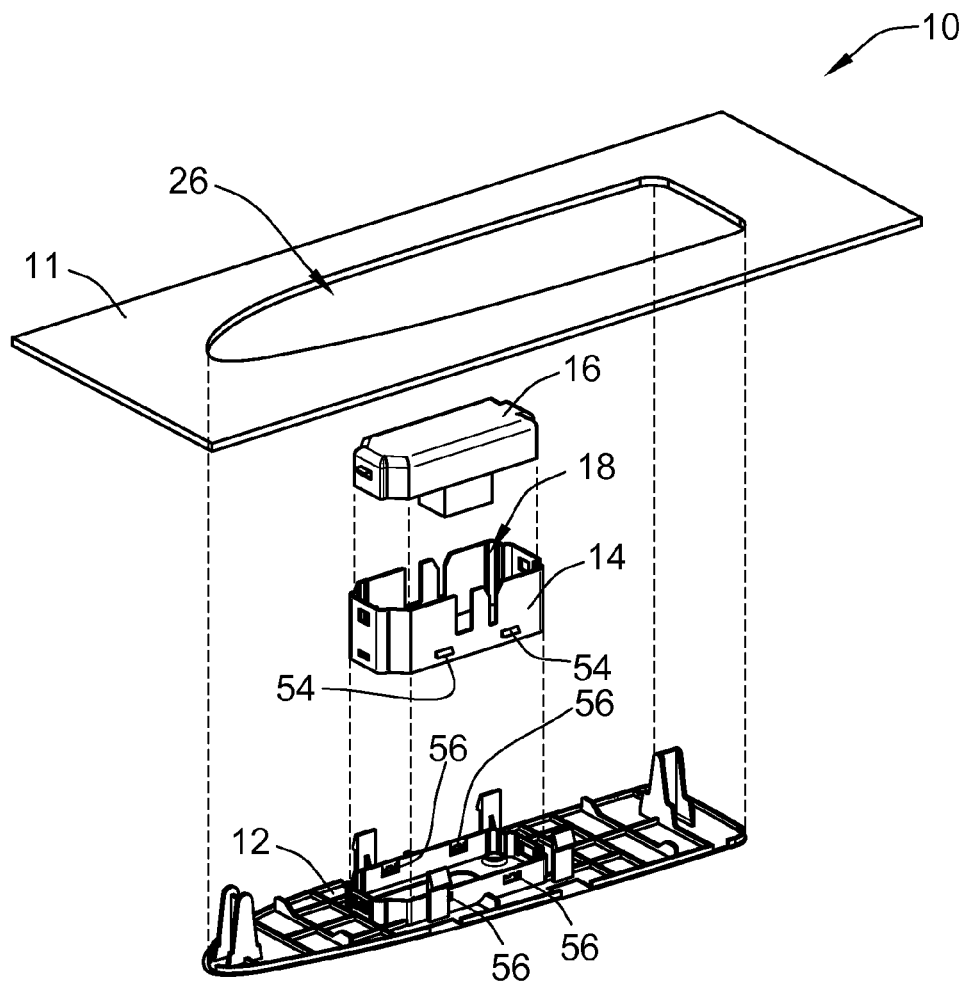
FIG. 1A is an exploded view of an exemplary switch engagement assembly in accordance with an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 1B:
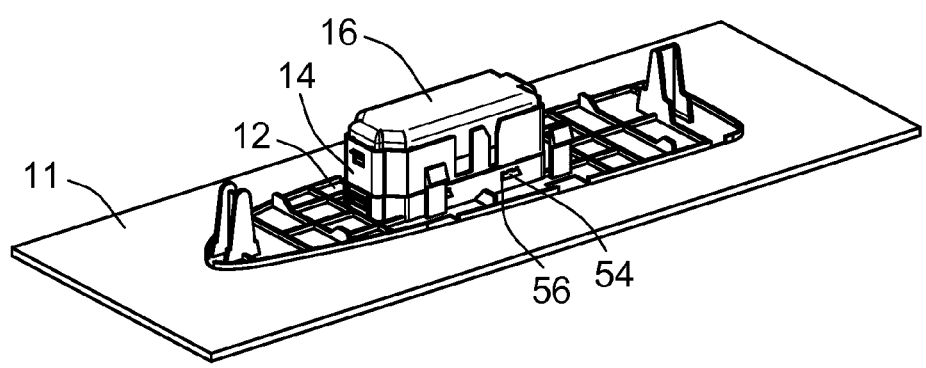
FIG. 1B is a perspective view of the exemplary switch engagement assembly in an assembled condition in accordance with an embodiment of the present invention.

FIG. 1A is an exploded view of an exemplary switch engagement assembly 10 in accordance with an embodiment of the present invention. FIG. 1B is a perspective view of the switch engagement assembly 10 shown in FIG. 1A. In the exemplary embodiment, the switch engagement assembly 10 is configured to be installed in a vehicle arm rest 11. Although the switch engagement assembly 10 is described in connection with the vehicle arm rest 11, the switch engagement assembly 10 is capable of use in other applications, and the vehicle arm rest 11 is merely shown and described as an example of one such application.

The switch engagement assembly 10 includes an armrest/trim feature referred to herein as a base 12 and a universal switch box (USB) 14. The base 12 is configured to be coupled to the vehicle arm rest 11. The USB 14 is configured to couple to the base 12. In the exemplary embodiment, the base 12 and the USB 14 are plastic components that are initially molded as separate components which are then assembled to form the switch engagement assembly 10.

The USB 14 is also configured to receive at least one exemplary electrical switch 16 therein. The electrical switch 16 may be a toggle switch or any other variety of electrical switch that is capable of operating a device. For example, the switch engagement assembly 10 may include a plurality of switches 16 that enable an operator to raise or lower the vehicle windows, lock or unlock the vehicle doors, adjust the vehicle mirrors, and/or adjust a position of the vehicle seats. The switches may include toggle switches, Arkless™ switches, touch activated switches, push switches, biometric switches, rocker switches, pressure sensitive switches, and/or electro-mechanical switches, for example.

As shown in FIG. 1B, the USB 14 is configured to be coupled to the base 12. The USB 14 is recessed in the base 12 such that switch 16 is mounted substantially flush with an exposed surface of the base 12. Moreover, the at least one switch 16 is configured to be secured within a cavity 18 defined in the USB 14 such that at least a portion of the switch 16 extends at least partially through the base 12 to enable an operator to manipulate the switch 16.

Figure 2A:
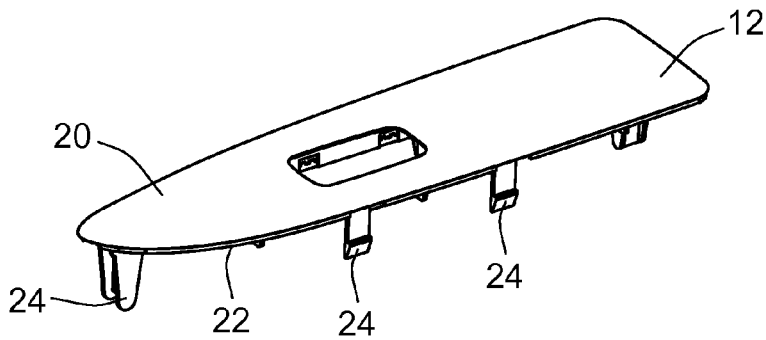
FIG. 2A is a top perspective view of the base shown in FIGS. 1A and 1B.
Figure 2B:
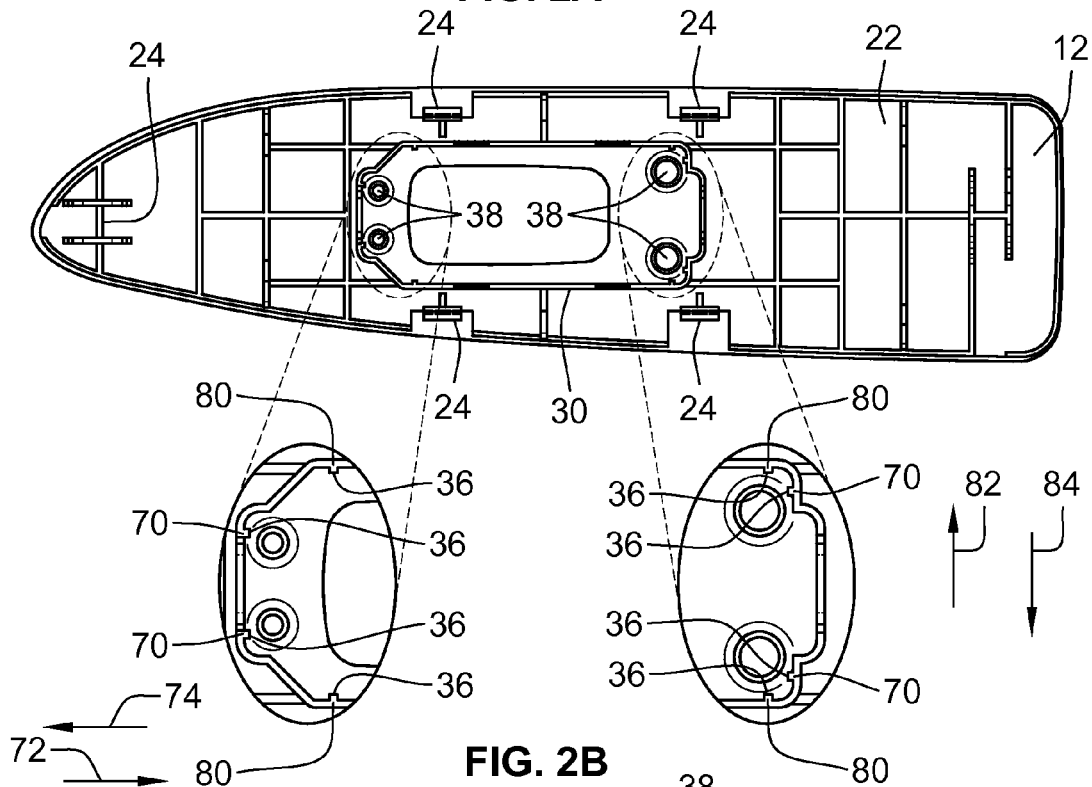
FIG. 2B is a bottom view of the base shown in FIG. 2A.
Figure 2C:
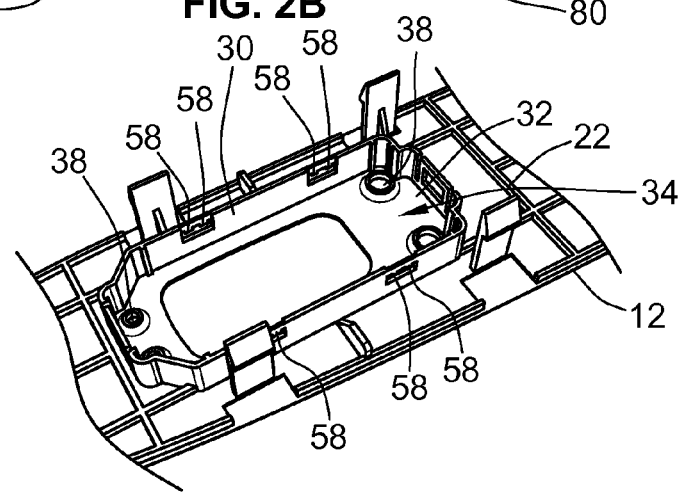
FIG. 2C is a more detailed bottom view of the base shown in FIG. 2B.

FIG. 2A is a top view of the base 12 shown in FIGS. 1A and 1B in accordance with an embodiment of the present invention. FIG. 2B is a bottom view of the base 12 shown in FIG. 2A. FIG. 2C is a more detailed bottom view of the base 12 shown in FIG. 2B. As shown in FIG. 2A, in the exemplary embodiment, the base 12 includes a first surface 20 that is utilized for decorative processes to improve the aesthetic appearance of the interior of the vehicle. For example, the first surface 20 may be decorated with a wood grain finish to match the wood grain finish of other interior portions of the vehicle. Moreover, the USB 14 may be decorated black to match the color of the switch 16. In the exemplary embodiment, the first surface 20 is painted based on a customer defined styling, e.g. wood grain, etc. Optionally, an appliqué may be attached to the first surface 20 based on the customer defined styling.

As shown in FIG. 2B, the base 12 also includes a second surface 22 that is opposite the first surface 20. The base 12 further includes a plurality of engagement features 24 disposed on the second surface 22. The engagement features 24 are configured to enable the base 12 to be coupled to the arm rest 11 (shown in FIGS. 1A and 1B). For example, during assembly, the engagement features 24 are configured to be inserted at least partially through an opening 26 (shown in FIG. 1A) that is defined in the arm rest 11. During assembly, the engagement features 24 at least partially retract to enable the engagement features 24 to be at least partially inserted into the opening 26. After the base 12 is properly positioned with respect to the arm rest 11, the engagement features 24 expand to facilitate securing the base 12 to the arm rest 11.

Referring to FIGS. 2B and 2C, the base 12 also includes a perimeter retainer wall 30. The perimeter retainer wall 30 and a portion 32 of the base 12 within the perimeter retainer wall 30 form a cavity 34 configured to receive the USB 14 therein.

As discussed above, the USB 14 is sized to house a specific type and size of electrical switch that is based on the vehicle that the switch engagement assembly 10 is being installed in. More specifically, the USB 14 is configured to accommodate a specific switch being utilized for the specific vehicle. The base 12 also includes a plurality of tunable centering devices 36 that are configured to enable the USB 14 to be positioned at a predetermined position within the cavity 34. The tunable centering devices 36 project or extend inwardly from the perimeter retainer wall 30. In the exemplary embodiment, the tunable centering devices 36 are formed unitarily with the perimeter retainer wall 30 and thus are also formed unitarily with the base 12. The tunable centering devices 36 are sized based on the USB 14 being installed in the cavity 34. For example, the tunable centering devices 36 may be made larger to facilitate utilizing a smaller USB 14. Moreover, the tunable centering devices 36 may be made smaller to facilitate utilizing a larger USB 14. In the exemplary embodiment, the tunable centering devices 36 are sized to enable the USB 14 to be friction fit within the cavity 34 and thus securely coupled to the base 12 to reduce the motion or "rattle" of the USB 14 with respect to the base 12. During operation, the tunable centering devices 36 also enable the USB 14 to be adjusted in front to back and cross car directions with respect to the base 12 to reduce the motion or "rattle" of the USB 14 with respect to the base 12. For example, during assembly, a set of tunable centering devices 70 may be adjusted to reposition the USB 14 in front to back directions 72 and 74 with respect to the base 12. Additionally, a set of tunable centering devices 80 may be adjusted to reposition the USB 14 in side-to-side directions 82 and 84 with respect to the base 12.

The base 12 further includes a plurality of tunable height devices 38 that enable the height of the USB 14, and thus the switch 16, to be adjusted with respect to the base 12. The tunable height devices 38 extend from the second surface 22 For example, as shown in FIG. 4B, during assembly the tunable height devices 38 may be adjusted to either reposition the USB 14 in a first direction 90 away from the base 12 or a second direction 92 toward the base 12. In one embodiment, the tunable height devices 38 are formed unitarily with the base 12. Optionally, the tunable height devices 38 may be formed as separate components that are coupled to the base 12 during assembly. The tunable height devices 38 may be sized based on the dimensions of the USB 14 being utilized. Optionally, the tunable height devices 38 may be adjustable to enable various USB's to be utilized with the base 12. During operation, the tunable height devices 38 are utilized to enable the height of the USB 14 to be adjusted with respect to the base 12. More specifically, upon assembly, the tunable centering devices 36 and the tunable height devices 38 are utilized to set the final position of the USB 14 with respect to the base 12 to enable the switch 16 to be properly positioned with respect to the first surface 20 and thus easily accessible by the operator.

Figure 3A:
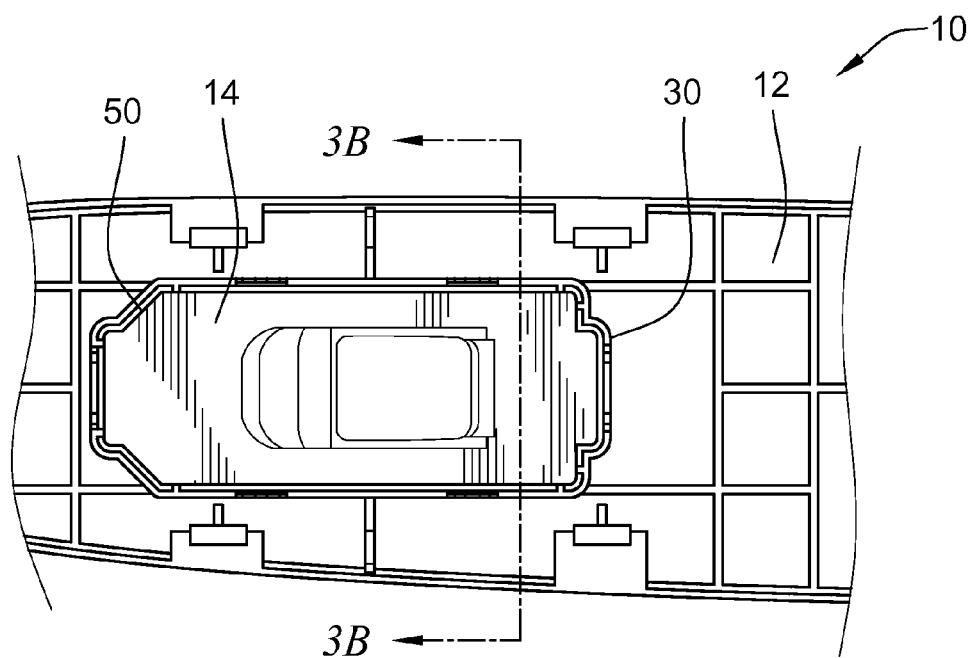
FIG. 3A is a bottom view of a portion of the switch engagement assembly shown in FIGS. 1A and 1B in accordance with an embodiment of the present invention.
Figure 3B:
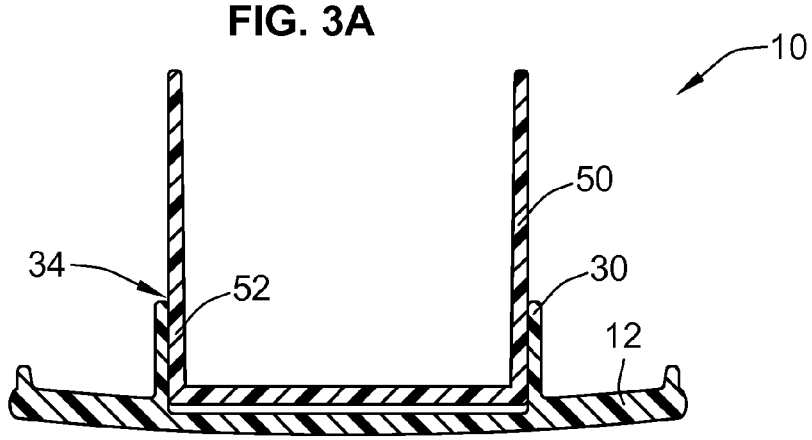
FIG. 3B is a cross-sectional view of a portion of the switch engagement assembly shown in FIG. 3A.

To assemble the switch engagement assembly 10, the switch engagement assembly 10 includes various features to enable the USB 14 to be coupled to the base 12. For example, FIG. 3A is a bottom perspective view of the base 12 in accordance with an embodiment of the present invention. FIG. 3B is a cross-section of the base 12 taken through lines 3B-3B. As shown in FIGS. 3A and 3B, in one embodiment, an outer surface 50 of the USB 14 has a geometry that is substantially similar to the geometry of the perimeter retainer wall 30 to enable the USB 14 to be at least partially inserted into the cavity 34 defined by the perimeter retainer wall 30 and the base 12. In the exemplary embodiment, the outer surface 50 of the USB 14 is complementary to an inner surface 52 of the perimeter retainer wall 30.

Figure 3C:
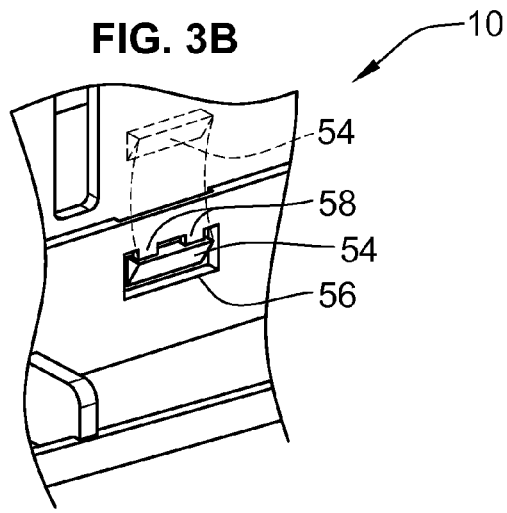
FIG. 3C is a detailed view of a portion of the switch engagement assembly shown in FIG. 3A.

Referring again to FIGS. 1A and 1B, the USB 14 also includes a plurality of snap features 54 that are each configured to engage with a respective snap window 56 formed in the base 12. During assembly, the snap features 54 at least partially retract to enable each snap feature 54 to be at least partially inserted into a respective snap window 56. After the USB 14 is properly positioned with respect to the base 12 (shown in FIG. 3B), the snap features 54 expand and are therefore locked within a respective opening or snap window 56 using at least one locking tab 58 to secure in the USB 14 to the base 12 as shown in FIG. 3C. The combination of the snap features 54, the snap windows 56, and the locking tabs 58 enable the USB 14 to be securely coupled to the base 12 as shown in FIG. 3B. In one embodiment, the tunable centering devices 36 and the tunable height devices 38 may be adjusted prior to the USB 14 being coupled to the base 12. Optionally, the tunable centering devices 36 and the height adjusting devices 38 may be adjusted after the USB 14 is coupled to the base 12.

Figure 4A:
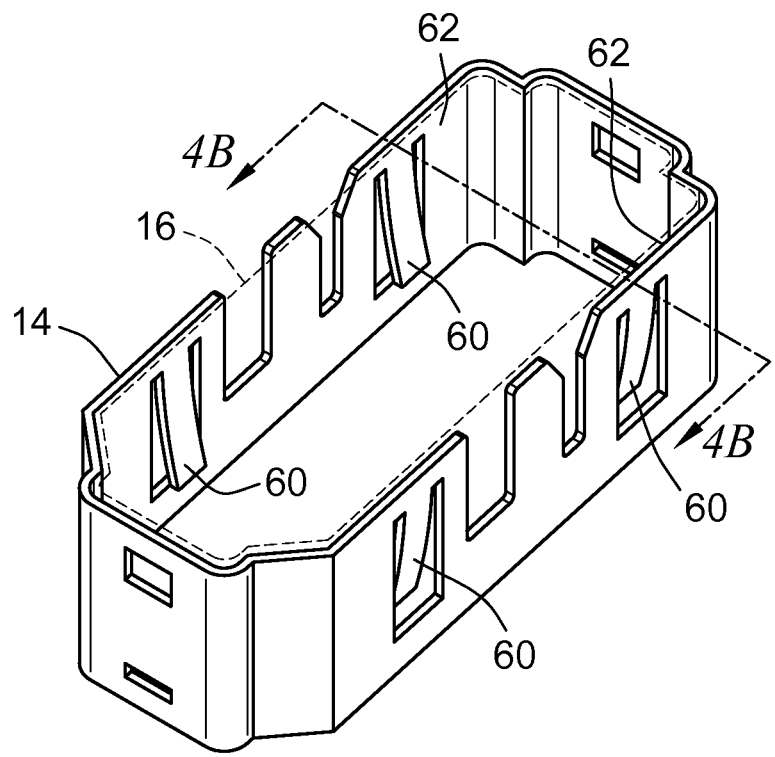
FIG. 4A is a bottom view of a portion of the switch engagement assembly shown in FIGS. 1A and 1B in accordance with an embodiment of the present invention.
Figure 4B:
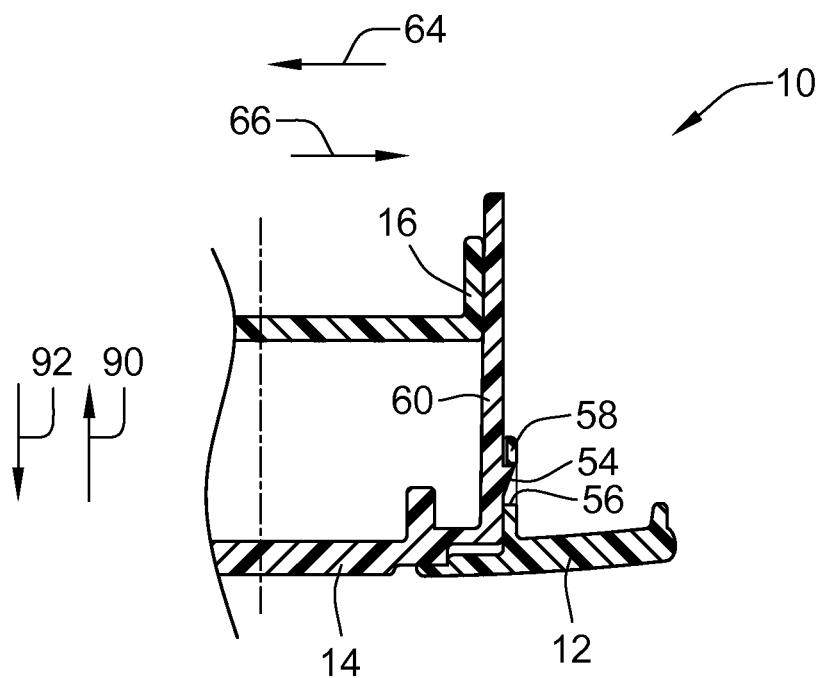
FIG. 4B is a detailed view of a portion of the switch engagement assembly shown in FIGS. 1A and 1B.

FIG. 4A is a bottom perspective view of the USB 14. FIG. 4B is a cross-section view of a portion of the USB 14 shown in FIG. 4A coupled to the base 12. After the USB 14 is coupled to the base 12 as discussed above, the switch 16 is installed into the USB 14. To enable the switch 16 to be securely coupled to the USB 14, the USB 14 includes a plurality of flexible lock ribs 60. The lock ribs 60 extend inwardly from the sidewalls 62 of the USB 14. In the exemplary embodiment, the USB 14 includes two lock ribs 60 installed on each sidewall 62. Optionally, the USB 14 may include fewer than two or greater than two lock ribs 60 to secure the switch 16 to the USB 14. In the exemplary embodiment, the lock ribs 60 are formed unitarily with the USB 14. The lock ribs 60 are each configured to move radially inward toward the sidewall 62 or radially outward from the side wall 62. For example, as shown in FIG. 4B, prior to assembly, the lock ribs 60 are each biased in a first direction 64, e.g. the lock ribs 60 are biased inwardly from the sidewalls 62. When the switch 16 is inserted into the USB 14, the switch 16 exerts a force on the lock ribs 60 causing the lock ribs 60 to move in a second opposite direction 66. The force also causes the lock ribs 60 to force the snap features 54 into a respective snap window 56. The locking tabs 58 then maintain then enable the USB 14 to be securely coupled or locked to the base 12 as shown in FIG. 4B. Moreover, the locking tabs 58 further facilitate encapsulating the USB 14 vertical walls between the perimeter retainer wall 30 (shown in FIG. 2B) and the switch 16 thus substantially preventing the USB 14 from disengaging from the base 12. The locking tabs 58 also reduce the movement of the USB 14 with respect to the base 12, thus reducing various noises such as buzzes, squeaks, and/or rattles of the switch 16 that may occur during operation of the vehicle.

Described herein is a switch engagement assembly 10. The switch engagement assembly 10 is an enclosure that is configured to engage and retain at least one customer defined switch mechanism, such as the switch 16. In the exemplary embodiment, the switch engagement assembly 10 is configured to be installed in the arm rest of a vehicle. The switch engagement assembly 10 may be installed at multiple positions in the vehicle, for example at multiple different armrests attached to different doors on multiple vehicle platforms.

The switch engagement assembly 10 includes two individual devices that snap together thus eliminating the need for fasteners, heat stakes, sonic welding, or any other secondary mechanical process to assemble the switch engagement assembly 10. Moreover, the switch engagement assembly 10 eliminates the need for a metal support bracket utilized by conventional cover plates. The switch engagement assembly 10 includes a switch box component that, in the exemplary embodiment, may be installed in three of the four arm rests of the vehicle. For example, the switch engagement assembly 10 may be installed in the front passenger door arm rest and the two rear passenger door arm rests. A switch engagement assembly including one or more switch boxes may also be installed in the driver side arm rest. The switch box may be used in multiple vehicle platforms. The switch engagement assembly 10 improves post molding conditions for decorated parts, does not utilize specialized masking tools during fabrication, and improves serviceability of warranty/field service repairs. Specifically, the base component or cover plate attached to the universal switch box may be decorated or painted prior to assembling the cover plate with the universal switch box. The individual devices, e.g. the separate base component and universal switch box, therefore enable the manufacturer to paint or otherwise decorate the switch box and the cover plate individually without the need for masking.

The switch engagement assembly 10 also includes the perimeter retainer wall, the tunable centering devices, and tunable height adjusting devices. The combination of the perimeter retainer wall, the tunable centering devices, and tunable height adjusting devices enable the switch engagement assembly to be utilized with and retain various different customer defined switch mechanism.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

What is claimed is:

1. A switch engagement assembly comprising:
a base including one of a plurality of snap features and a plurality of snap windows; a switch box configured to couple to the base, the switch box including the other one of the plurality of snap features and the plurality of snap windows, wherein each of the plurality of snap windows of one of the base and the switch box is configured to receive a respective one of the plurality of snap features of the other of the base and the switch box to snap the switch box to the base; and a plurality of tunable height devices configured to reposition the switch box in a first direction with respect to the base; and a plurality of tunable centering devices configured to reposition the switch box in a second different direction with respect to the base.

2. A switch engagement assembly in accordance with claim 1 wherein the base comprises a decorative trim surface that is disposed on a surface that is opposite to the one of the plurality of snap features and the plurality of snap windows.

3. A switch engagement assembly in accordance with claim 1 wherein the base comprises:
a decorative surface disposed on a first side of the base; and
a retaining wall disposed on an opposite second side of the base, the retaining wall configured to receive the switch box therein.

4. A switch engagement assembly in accordance with claim 1 wherein the base includes a plurality of engagement features configured to couple the base to a vehicle arm rest.

5. A switch engagement assembly in accordance with claim 1 wherein the switch box is configured to receive an electrical toggle switch device therein, the electrical toggle switch device being friction fit into the switch box.

6. A switch engagement assembly in accordance with claim 1 wherein the base comprises a retaining wall and wherein the plurality of tunable centering devices are configured to axially reposition the switch box within the retaining wall.

7. A switch engagement assembly in accordance with claim 1 wherein the switch box comprises a plurality of lock ribs configured to secure an electrical switch within the switch box and to secure the switch box to the base.

8. The switch engagement assembly in accordance with claim 1 wherein the base securely couples to the switch box without separate and distinct fasteners.

9. A vehicle arm rest switch engagement assembly comprising: a vehicle arm rest; a base including one of a plurality of snap features and a plurality of snap windows, the base coupling to the vehicle arm rest; a switch box coupling to the base, the switch box including the other one of the plurality of snap features and the plurality of snap windows, wherein each of the plurality of snap windows of one of the base and the switch box is configured to receive a respective one of the plurality of snap features of the other of the base and the switch box to snap the switch box to the base; and a plurality of tunable height devices configured to reposition the switch box in a first direction with respect to the base; and a plurality of tunable centering devices configured to reposition the switch box in a second different direction with respect to the base.

10. A vehicle arm rest switch engagement assembly in accordance with claim 9 wherein the base comprises a decorative trim surface that is disposed on a surface that is opposite to the one of the plurality of snap features and the plurality of snap windows.

11. A vehicle arm rest switch engagement assembly in accordance with claim 9 wherein the base comprises:
a decorative surface disposed on a first side of the base; and
a retaining wall disposed on an opposite second side of the base, the retaining wall configured to receive the switch box therein.

12. A vehicle arm rest switch engagement assembly in accordance with claim 9 wherein the switch box is configured to receive an electrical toggle switch device therein, the electrical toggle switch device being friction fit into the switch box.

13. A vehicle arm rest switch engagement assembly in accordance with claim 9 wherein the base comprises a retaining wall and the plurality of tunable centering devices are configured to axially reposition the switch box within the retaining wall.

14. A vehicle arm rest switch engagement assembly in accordance with claim 9 wherein the switch box comprises a plurality of lock ribs configured to secure an electrical switch within the switch box and to secure the switch box to the base.

15. The vehicle arm rest switch engagement assembly in accordance with claim 9 wherein the base securely couples to the switch box without separate and distinct fasteners.

\* \* \* \* \*